April 12, 1938.  H. E. HEIGIS  2,114,265
VALVE FOR AIRPLANE FLOTATION APPARATUS
Filed Sept. 25, 1936  3 Sheets-Sheet 1

INVENTOR
HENRY ERNEST HEIGIS
BY
ATTORNEY

April 12, 1938.  H. E. HEIGIS  2,114,265

VALVE FOR AIRPLANE FLOTATION APPARATUS

Filed Sept. 25, 1936  3 Sheets-Sheet 2

INVENTOR
HENRY ERNEST HEIGIS
BY
ATTORNEY

April 12, 1938.  H. E. HEIGIS  2,114,265
VALVE FOR AIRPLANE FLOTATION APPARATUS
Filed Sept. 25, 1936  3 Sheets-Sheet 3

INVENTOR
HENRY ERNEST HEIGIS
BY Paul G. Anderson
ATTORNEY

Patented Apr. 12, 1938

2,114,265

UNITED STATES PATENT OFFICE

2,114,265

VALVE FOR AIRPLANE FLOTATION APPARATUS

Henry Ernest Heigis, West Orange, N. J., assignor to Walter Kidde & Company, Inc., Bloomfield, N. J., a corporation of New York Application September 25, 1936, Serial No. 102,504

8 Claims. (Cl. 137—139)

The present invention relates to flotation equipment for aircraft adapted for use when the aircraft lands upon a body of water and embodies an improved apparatus wherein inflatable devices are provided on the aircraft which are adapted to be inflated by a buoyant fluid normally stored in a fluid pressure container.

More specifically, the invention embodies in combination with the above apparatus, a device for automatically releasing the buoyant fluid from the fluid pressure container and for discharging the fluid into the inflatable devices when the aircraft descends on water.

Airplane flotation equipment wherein inflatable bags were provided on aircraft connected to a source of fluid medium under pressure has been employed in the past. These systems were not automatic but deepnded upon the pilot or occupant of the aircraft actuating the device which released the fluid medium from its container and discharged it into the flotation bags when it was necessary to inflate the bags. The disadvantage of these systems was that there was a possibility that the gas might be released into the bag before the plane actually had alighted on the water by the over-anxious occupant of the plane. If this was done, the great resistance offered by the inflated bags would make the travel of the plane through the air very dangerous, or wind resistance might tear the bags from the plane, thus rendering them valueless.

In order to eliminate, as far as possible, the personal factor in the operation of devices of this character, various automatic devices have been developed to inflate the bags only after the airplane has descended on the body of water. Some of these devices have been very cumbersome and complicated, and therefore, the present invention has been designed in order to provide a simple and uncomplicated mechanism whereby a supply of fluid is automatically released to inflate the flotation bags upon contact of the aircraft with the body of water on which it is to rest.

A further object of the invention is to provide a system of the above character which functions automatically upon the initial contact of the plane with the water regardless of the position in which the airplane lights on the water.

Another object of the invention is to provide an automatic mechanism for actuating flotation equipment of the above character wherein advantage is taken of a very slight pressure, such as a static head of six inches of water, to release the inflating mechanism of the equipment.

A still further object of the invention is to provide a device which affords a safety precaution against dangerous increases of pressure and temperatures of the confined inflating and buoyant medium, this mechanism being such as to permit the relief of the mechanism within the container without discharging the same into the flotation equipment.

Still another object is to provide a device of the above character wherein means are incorporated for enabling the same to be reseated without the possibility of a faulty setting which would render the system unresponsive to predetermined conditions.

A further object of the invention is the provision of an automatic valve that may be opened by the pressure of the fluid medium stored in the container when the mechanism has been released thus insuring a positive acting valve.

Still another object of the invention is to provide a valve which opens very rapidly to release the fluid medium stored in the container substantially and simultaneously with the operation of the release mechanism.

A further object is the provision of a releasing mechanism in the valve which is simple, positive, and almost instantaneous in its operation.

Further objects will be apparent as the invention is described in greater detail in connection with the accompanying drawings wherein.

Figure 1:
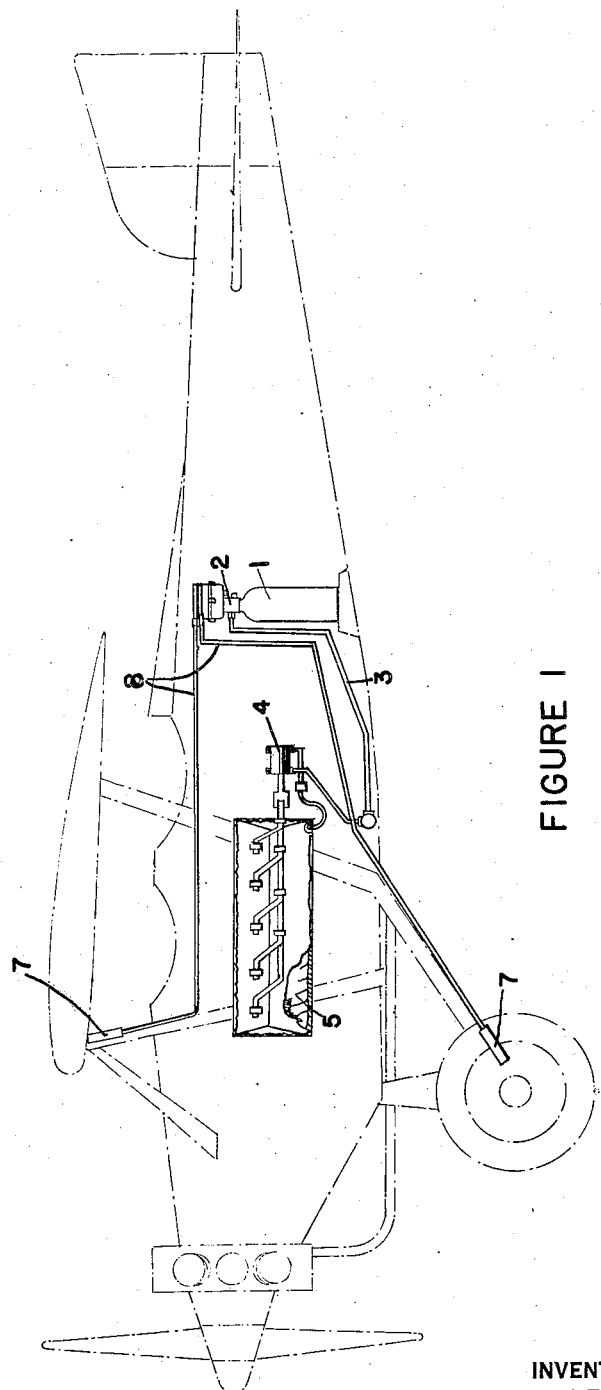
Figure 1 is a plan view of the apparatus constructed in accordance with the present invention as applied to an airplane which is shown in dot and dash lines.

Referring to Figure 1, the container of a high pressure fluid medium such as carbon dioxide is illustrated at 1. Surmounting the container is a release valve 2 which is connected by conduits 3 to a piston bag release mechanism 4.

The piston bag release mechanism 4 will not be described in detail since it forms no part of the present invention. It is provided in order to release the flotation bags 5 from their containers in the fuselage of the ship, and to direct the fluid pressure medium from the container to the bags through the conduit 3.

The release valve is actuated by the entrance of water into the actuators 7 which communicate with the valve by the conduits 8. As is shown in this figure, actuators are provided at various points on the airplane in order that the valve will be operated whether the airplane lands on water in an upright or in an inverted position.

Figure 2:
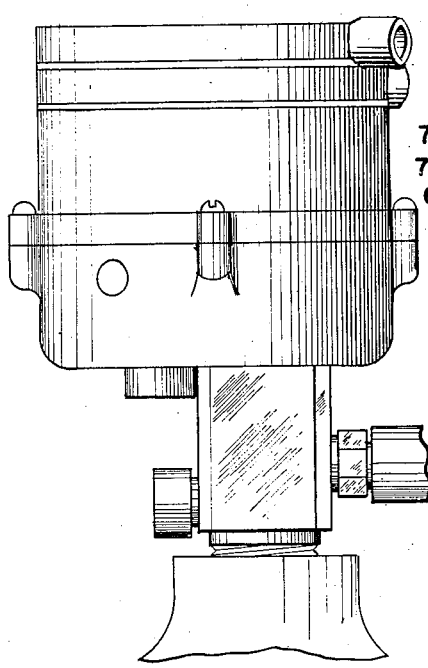
Figure 2 is a side elevational view of the releasing mechanism constructed in accordance with the present invention.

The release valve 2, the external view of which is illustrated by Figure 2, will now be described in greater detail by particular reference to Figure 3.

The container 1 is provided with internal threads 9 on its neck portion. The valve body 10 is secured to the container by means of these threads. The valve body 10 is provided with a passage 11 which communicates at one end with the interior of the container by means of the syphon tube 12 secured in the passage 11 by the threads 13. The other end of the passage terminates in a valve seat 14. At a point intermediate the ends of the passage, a transverse passage 15 is provided which is normally closed by a frangible disc 16, resting on a gasket 17 and held in position by the plug 18.

The plug 18 has a passage 19 which communicates with the atmosphere through the bores 20. The bores 20 are drilled at right angles to the passage 19 in order that there will be no recoil effect set up by the escaping fluid medium when it passes to the atmosphere from the passage 19.

The purpose of the passage 15 is to provide a safety relief outlet should the pressure in the supply container become excessive and dangerous. On the occurrence of such an event the safety disc 16 will burst and allow the gas to escape.

The valve seat 14 at the end of the passage 11 is located in a valve chamber 21 of the valve body. An outlet port 22 is furnished in the wall of the chamber and is the port through which the inflating medium is discharged when it is to be employed. Accordingly, the port is provided with threads 23 so that an adaptor 24 may be secured thereto. The adaptor 24 has threads 25 to secure it to the conduit 3. The conduit 3 leads to the piston bag release mechanism 4 as is shown in Figure 1.

A stem 26 adapted to move toward and away from the valve seat 14 and carrying a valve seating material 27 which coacts with the valve seat 14 is provided in the chamber 21.

Figures 8, 9:
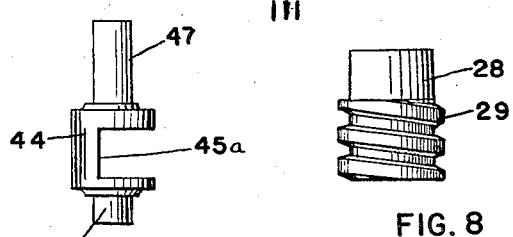
Figure 8 is a view of an element of the device of Figure 2.
Figure 9 is a view of another element of the device of Figure 2.

Surrounding the stem 26 and threadedly engaged therewith is a bushing 28. The threads connecting the bushing with the stem are ordinary slow lead threads. The outer portion of the bushing has fast lead threads 29 that engage, in turn, with corresponding threads provided on the plug 30. The external view of bushing 28 is shown in Figure 8.

The plug 30 is secured to the wall of the valve body by the threads 31. A shoulder 32 provided in the chamber has resting thereon a metal stop 33. Between the metal stop 33 and the shank of the stem 26 is a leather filler piece 34 which continually wipes the stem and prevents leakage of any fluid pressure medium escaping from the container past the threads between the stem and the bushing 28.

Between the leather filler piece 34 and the end of the plug 30 is a brass washer 35. The washer serves as a stop for the bushing 28 and also secures the leather filler piece 34 against the stop 33. The stem is provided with a head 36 which coacts with the stop 33 when the stem is in its uppermost position and prevents overriding of the stem. At the opposite end of the stem flat facings 37 have been ground upon the shank in order that it may be gripped by a wrench or other tool.

From the foregoing description it will be seen that the valve may be opened by raising it from the seat 14 by using one of two methods.

It may be raised from the seat rapidly by employing the fast lead threads 29, or more slowly by the employment of the threads between the stem and the bushing 28. The pressure of the medium stored in the container will assist the valve to an open position when the fast lead threads are used, since it will tend to push the valve up. This, however, is not true of the slow lead threads which must be manually rotated. The fast lead threads are designed so that there is no manual rotation necessary. Merely providing a pressure against the valve head will rotate the bushing.

Figure 4:
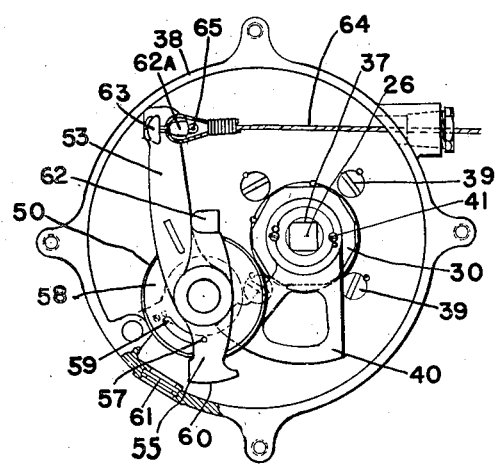
Figure 4 is a top plan view of the valve mechanism of Figure 2 with the diaphragm chamber and the lever chamber removed.

Since this is true, a locking means must be provided in order to prevent the valve from rising from its seat and permitting the medium to escape before it is desired. For this purpose a series of levers are provided which are mounted in a lever chamber 38 secured to the valve body 10 by the screws 39 which are illustrated in Figure 4.

A rotating lever 40 is secured to the bushing 28 by the set screws 41 in such a manner that it will move when the bushing is rotated. To one side of the valve body in the lever chamber is a recess 42, shown in Figure 3. A journal 43 rests in this recess and serves to guide a cam 44, one end 45 of which is bushed in the journal 43. The cam proper 44 has a cam face or cut-out portion 45a through which the lever 40 may pass when it is desired that the pressure of the gas in the container 1 raise the valve from the seat. An external view of the cam 44 may be seen in Figure 9. Ordinarily the lever 40 rests against the cam 44, and since the face 45a is rotated into such a position that the lever cannot pass through it, the valve will be firmly maintained on its seat.

Figure 3:
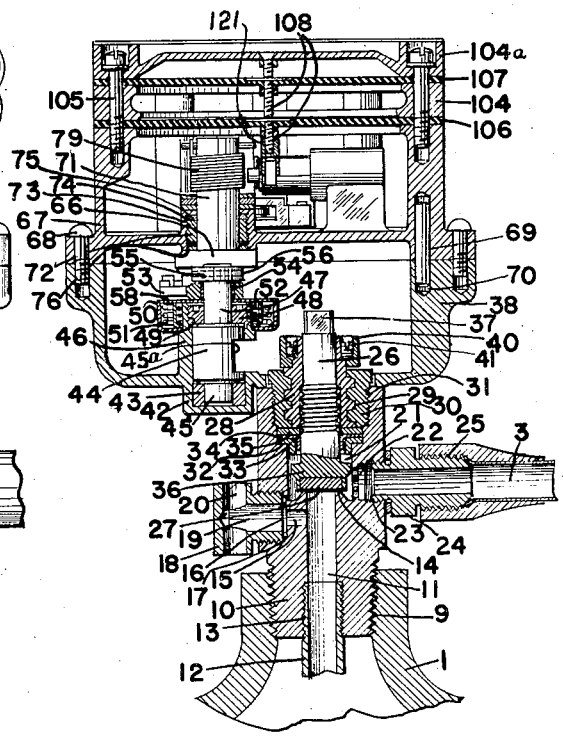
Figure 3 is a view in cross section of the device shown in Figure 2.

A wall 46, illustrated in Figure 3, rises from the recess 42 in the lever chamber. The opposite end 47 of the cam 44 is journaled by a bushing 48 that is fastened securely by some means such as the threads 49 to the wall 46.

Resting on the top of the wall 46 is a spring casing 50, containing springs 51 and 52, the purpose of which will be explained hereinafter. A crank lever 53 surrounds the end 47 of the cam 44. A sleeve 54 is provided between the crank lever 53 and the end 47 of the cam. The crank lever is connected to one end of the spring 51 contained in the spring casing 50. Above the crank lever 53 on the end 47 of the cam lever 44 is an indicator 55. These parts may be separated by a washer in order to prevent wearing of the levers but this is not necessary. The pin 56 secures the indicator lever to the cam end 47.

The spring 52 has one end attached to the indicator lever 55 as illustrated at 57 in Figure 4. The cover 58 of the spring casing 50 has a slot 59 in which the end of the spring may move when the indicator lever 55 is rotated. One end 60 of the indicator lever has indicating markings on its face which may be seen through the indicator window 61 existing in the wall of the lever chamber 38. The opposite end of the indicator lever has a projecting lug 62 bearing against the crank lever 53. It will thus be seen that when the crank lever 53 is moved the indicator lever also is moved, and thus an indicating sign is given whenever the valve is opened.

At the end of the crank lever 53, opposite to that on the cam 44, is a lug 62ª and a raised portion 63. The crank lever is provided in order that the valve may be opened manually. This is accomplished by looping a cable 64 over the lug 62ª and passing a cotter pin 65 through the lug 62ª and the projecting portion 63 to prevent the cable from slipping off the lug 62ª.

In order to release the lever 40, the cam 44 must, of course, be rotated so that the pressure of the fluid medium may act upon the valve and force it up from the seat. It is obvious that there are two methods of rotating the cam. One method would be to rotate the indicator lever, since that is keyed to the cam end 47. The other method would be to pull the cable 64 thereby rotating the crank arm 53. When this is done the crank arm 53 bears on the lug 62 of the indicator arm and moves the indicator arm around, thereby rotating the cam 44. The latter method provides the manual actuation of the valve.

Figure 5:
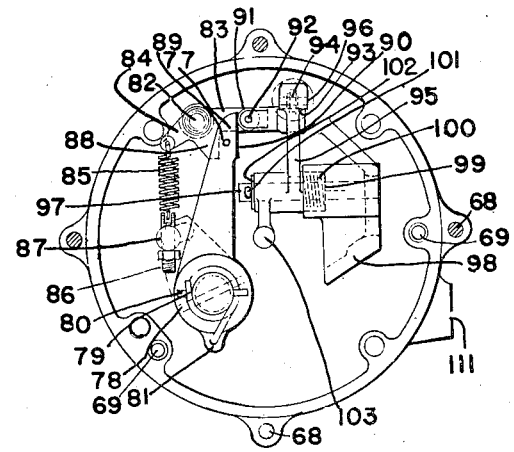
Figure 5 is a top plan view of the lever chamber with the diaphragm chamber removed showing the levers in an unoperated position.
Figure 6:
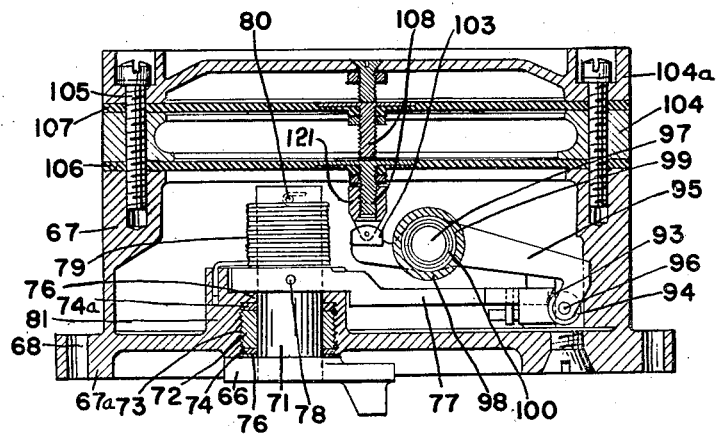
Figure 6 is a view in cross-section of the lever and diaphragm chambers of Figure 3 taken at an angle of 90° thereto.
Figure 7:
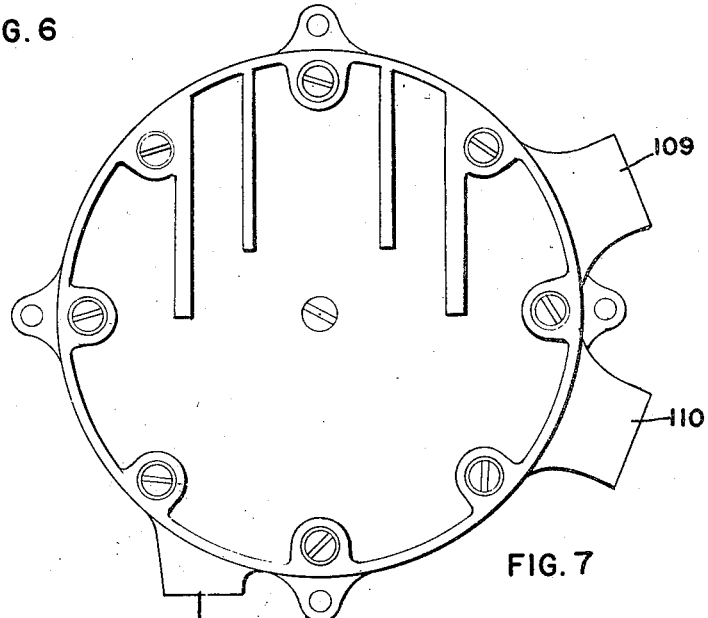
Figure 7 is a top plan view of the device of Figure 2.

To operate the valve automatically a release mechanism chamber as illustrated in Figures 5 and 6 is provided. The release mechanism chamber consists of a casing 67 and a casing base 67ª which is fastened to the lever chamber 38 by the studs 68. The release mechanism must be positioned accurately with respect to the lever chamber 38 and for this purpose pins 69 are provided which seat in holes 70 on the lever chamber 38. In the lever chamber is a striking arm 66 which contacts lug 62 on the indicator lever to move the indicator arm to the valve operating position. The striking arm 66 is fastened to a shaft 71 by some suitable method. The shaft 71 extends through the base 67ª of the release mechanism chamber into the lever chamber. A lock bushing 72 surrounding the shaft 71 is secured in the base 67ª by threads 73 directly adjacent to the striking arm 66.

The bushing 72 rests directly on packing material 74 and 74ª. The packing material 74 is pressed on the bushing 72 by another bushing 75. The shaft is provided with a shoulder 76 on which the locking bushing 72 presses the packing 74ª in order to hold the shaft in the wall and at the same time permit it to rotate freely. Above the base 67ª and bearing against it is a cam lever 77 which is fastened to the shaft by the pin 78. A spring 79 surrounds the shaft 71 and is fastened to the pin 80 passing through the shaft at one end and secured in the projection 81 on the wall 67 at the other end.

At a short distance from the shaft is a round pin 82 secured on the base of the casing. A bell crank lever 83 rotates about this shaft as a fulcrum. The bell crank lever has a projecting ear 84 to which a coil spring 85 is attached. The other end of the coiled spring is secured to an adjusting screw 86 which passes through a projection 87 on the release mechanism base 67ª, the adjusting screw obviously being provided in order to secure various tensions on the spring.

A second ear 88, on the bell crank lever 83, serves as a stop for the cam lever 77. The cam lever 77 has a pin 89 which hits the ear 88 and prevents the cam lever from passing the ear. The cam lever has a cam surface 90 that bears on a roller 91 secured on the bell crank lever by a shaft 92.

In the outer end of the lever 83 a roller surface 93 is furnished. A roller 94 journaled on a trip lever 95 by the shaft 96 bears on this surface. The trip lever itself is carried by an axle 97 that is carried by an axle housing 98 which is integral with the lever base 67ª. The axle housing has a recess 99 in which is placed a spring 100. The spring 100 is connected with the trip lever 95 and tends to rotate in a direction which will make it engage with the surface 93 on the bell crank lever 83. The trip lever 95 is held on the axle 97 by the cotter pin 101 and the washer 102 which are held on the end of the axle.

The trip lever has an extending push button lever 103 which will permit the trip lever to rotate against the force of the spring 100. When the releasing mechanism is ready for use the position of the levers will be that of the levers shown in Figure 5.

Accordingly it will be seen that the cam lever 77 is held from rotating in a clockwise position by the roller 91 on the bell crank lever. The bell crank lever is, in turn, held from turning to a counter-clockwise position by the trip lever roller 94 acting on the surface 93 of the bell crank lever 83, the trip lever being itself held in a position to prevent these movements by the spring 100.

When the push button 103 is pressed, the trip lever roller 94 will leave the surface 93 of the bell crank lever and permit it to rotate about the shaft 82 to a position which will release the cam lever 77 and allow it to move in a clockwise position. The rotation of the cam lever 77 will rotate the striking arm 66 which is journaled to the shaft 71 and cause it to strike the indicator lever 55 in the lever chamber of the valve.

As the striking arm 66 is rotated further it moves the indicator arm and the cam 44 to a position where the lever 40 may rotate, thus allowing the gas in the container to raise the valve by means of the rapid lead threads 29.

In order to provide a means to move the push button 103 on the trip lever 95, a diaphragm chamber consisting of two parts 104 and 104ª is secured to the releasing chamber case 67 by the studs 105. A diaphragm 106 rests between the casing 104 and the casing 67 and a second diaphragm 107 lies between the casing 104 and 104ª. The diaphragms are provided with studs 108 at the center of each diaphragm. The stud on the diaphragm 106 is fastened by a fitting 121 to the push button 103. The stud on the diaphragm 107 rests against the upper face of the stud on the diaphragm 106 and thus movement of the diaphragm 107 is transmitted directly to the push button 103.

The casing 104ª has an opening 109 and the casing 104 has an opening 110 which are connected to the conduits 8 leading to the actuators 7. After the actuator is operated it builds up a static pressure of about six inches which is communicated from the actuator to its respective casing and presses on the diaphragm moving the center portion of the diaphragm in a downward direction.

The pin 108 provided in the diaphragm will then move the push button lever causing it to release the release mechanism. If the upper diaphragm 107 is actuated by its respective actuator, its pin will strike the lower diaphragm and force the pin of the lower diaphragm 106 to strike the push button on the trip lever.

When the airplane lands in water, the actuators are so designed that the air in the actuators and the conduit 8 is compressed and the pressure will be transmitted to chambers containing the diaphragms. However, on some occasions if the lever chamber 67 is wholly sealed and the temperature should rise the pressure in that chamber might rise to such a point that the diaphragms would not be able to move and actuate the tripping lever. For this reason a vent 111 is provided in order to relieve this pressure and always permit the diaphragms to move into the chamber.

It will thus be seen that if an airplane should land on a body of water, the one or more actuators will set up the necessary static pressure to move the diaphragms and thus release the valve so that the pressure of the gas may open the valve and permit the gas to pass from the container through the conduit 3 to the piston bag release mechanism where the gas will open the flotation bag containers and then enter the flotation bag containers to inflate them in order that the airplane may be floated.

Although I have described my invention with reference to certain physical embodiments thereof I do not wish to be limited save as defined in the appended claims.

I claim:

1. A valve assembly adapted for use with a medium under pressure comprising a valve body, a passage in the body, a seat in the passage, a valve head to engage the seat, a stem on the valve head, a bushing in the passage, slow lead threads on the stem to engage the bushing whereby the valve head may be raised slowly from the seat, fast lead threads on the bushing to engage the body adapted to raise the valve head from the seat rapidly by the pressure of the medium, a lever on the bushing, a cam to normally prevent rotation of said lever and maintain the valve head on the seat, an indicator lever associated with the cam to rotate the cam, a manually operated crank lever to actuate the indicator lever, a rotatable shaft, a spring to rotate the shaft, a striking arm on the rotatable shaft adapted to engage the indicator lever and rotate the cam, a cam lever attached to the shaft, a rotatable bell crank lever associated with the cam lever, a spring to cause the bell crank lever to rotate, a trip lever to prevent rotation of the bell crank lever, a spring on the trip lever to prevent movement thereof, a pair of chambers having inlets, a pressure operated diaphragm in each chamber, and pins on said diaphragms adapted to actuate the trip lever and permit release of the said lever on the bushing.

2. A valve assembly adapted for use with a medium under pressure, comprising a body, a passage through the body, a seat in the passage, a valve head to engage the seat, a stem on the valve head, a bushing in the body, engaging the wall thereof with fast lead threads, said stem engaging the bushing with slow lead threads, a rotating lever associated with the bushing, a locking cam normally preventing rotation of the lever, an indicator lever to rotate the cam, and a pressure operable trip mechanism to cause the indicator lever to rotate the cam and release the rotating lever and bushing whereby the pressure of the medium will raise the valve head from the seat comprising, a shaft, a striking arm on the shaft adapted to move the indicator lever, a spring on the shaft normally tending to cause the indicator lever to move the cam, a series of interengaging levers to prevent movement of the striking arm and shaft, a trip lever to release said interengaging levers, and pressure operable diaphragms to operate said trip lever.

3. In a valve assembly for a container of a fluid medium under pressure, a body provided with a seat, a valve member to engage the seat, means associated with the valve member rotatably engaging the body with fast lead threads, whereby the valve member may be raised by the fluid medium under pressure, means normally retaining the valve member on the seat including a rotatably mounted cam-like member and a lever secured thereto and adapted to rotate therewith, an indicator on said lever, a housing enclosing said means, an indicator opening in said housing, and means to move the lever and the cam-like member to the non-retaining position at the same time that the indicator is brought into alignment with the indicator opening to permit observation thereof.

4. A valve assembly adapted for use with a fluid medium under pressure comprising a body having a seat therein, a valve proper to coact with the seat and adapted to be raised by the pressure of the fluid medium, means normally retaining the valve proper on the seat including a rotatably mounted cam-like member and a lever secured thereto and provided with an indicator, a housing enclosing said means, an indicator opening in said housing, manual means to move the lever and the cam-like member to the non-retaining position, and pressure operable means to move the lever and the cam-like member to the non-retaining position, movement of the lever serving to bring the indicator into alignment with the indicator opening to permit observation thereof.

5. A valve assembly adapted for use with a medium under pressure comprising a valve body, a passage in the body, a seat in said passage, a valve head to engage said seat, means associated with said body and said head to permit the pressure of the medium to raise said head, means engageable with said head and normally preventing said pressure of said medium from raising said head, said means including a rotatable lever associated with said head, a locking cam normally preventing rotation of said lever and the raising of said head, an indicator lever to rotate said cam to release said lever for rotation, and a pressure operable trip mechanism to cause the indicator lever to rotate the cam and release the rotating lever whereby the pressure of the medium will raise the valve head from the seat comprising, a shaft, a striking arm on the shaft adapted to move the indicator lever, a spring on the shaft normally tending to cause the indicator lever to move the cam, a series of interengaging levers to prevent movement of the striking arm and shaft, a trip lever to release said interengaging levers, and pressure operable means for operating said trip lever.

6. A valve assembly adapted for use with a medium under pressure comprising a valve body, a passage in the body, a seat in said passage, a valve head to engage said seat, means associated with said body and said head to permit the pressure of the medium to raise said head, means engageable with said head and normally preventing said pressure of said medium from raising said head, said means including a rotatable lever associated with said head, a locking cam normally preventing rotation of said lever and the raising of said head, an indicator lever to rotate said cam to release said lever for rotation, a manually operated crank lever to actuate the indicator lever, a rotatable shaft, a spring to rotate the shaft, a striking arm on the rotatable shaft adapted to engage the indicator lever and rotate the cam, a cam lever attached to the shaft, a rotatable bell crank lever associated with the cam lever, a spring to cause the bell crank lever to rotate, a trip lever to prevent rotation of the bell crank lever, a spring on the trip lever to prevent movement thereof, and pressure operated means for actuating said trip lever and permit the release of said first named lever.

7. A valve assembly adapted for use with a medium under pressure, comprising a valve body, a passage in said body, a seat in said passage, a valve including a stem and a head engageable with said seat, means associated with said valve to permit the head thereof to be raised from said seat by the pressure of said medium, a lever carried by said stem, cam means engageable with said lever to prevent the raising of said valve by said pressure, a spring associated with said cam means, a second lever connected to said cam means and movable against the action of said spring to disengage said cam means from said first lever, spring actuated means engageable with said second lever to actuate the same to release said cam and first lever, a second spring actuated means engageable with said first spring actuated means and normally movable to release the same, trip means engageable with said second spring actuated means for preventing the actuation thereof, and pressure actuated means for disengaging said trip.

8. The structure of claim 7, and means indicating the position of said valve associated with said second lever.

HENRY ERNEST HEIGIS.